(12) United States Patent
Malatack et al.

(10) Patent No.: US 11,272,325 B2
(45) Date of Patent: *Mar. 8, 2022

(54) SYSTEM AND METHOD FOR COMMUNICATING THROUGH MULTIPLE ENDPOINTS

(71) Applicant: Twilio Inc., San Francisco, CA (US)

(72) Inventors: Patrick Malatack, San Francisco, CA (US); Gowri Rao, San Francisco, CA (US); Kenneth Hoxworth, San Francisco, CA (US); Elaine Tsai, San Francisco, CA (US); Saurabh Daftary, Concord, CA (US); Triet Kha, San Francisco, CA (US); Julie Laver, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,828

(22) Filed: Aug. 8, 2019

(65) Prior Publication Data

US 2020/0037117 A1 Jan. 30, 2020

Related U.S. Application Data

(63) Continuation of application No. 15/154,752, filed on May 13, 2016, now Pat. No. 10,419,891.

(Continued)

(51) Int. Cl.
*H04W 4/06* (2009.01)
*H04W 4/14* (2009.01)
*H04W 4/02* (2018.01)

(52) U.S. Cl.
CPC ............. *H04W 4/06* (2013.01); *H04W 4/025* (2013.01); *H04W 4/14* (2013.01)

(58) Field of Classification Search
CPC ... H04L 63/0245; H04L 63/105; H04L 63/30; H04L 63/302; H04L 63/0838;
(Continued)

(56) References Cited

U.S. PATENT DOCUMENTS

| 5,274,700 A | 12/1993 | Gechter et al. |
| 5,526,416 A | 6/1996 | Dezonno et al. |

(Continued)

FOREIGN PATENT DOCUMENTS

| DE | 1684587 A1 | 3/1971 |
| EP | 0282126 A2 | 9/1988 |

(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.

(Continued)

*Primary Examiner* — Un C Cho
*Assistant Examiner* — Rasha K Fayed
(74) *Attorney, Agent, or Firm* — Lowenstein Sandler LLP

(57) ABSTRACT

A system and method for a communication system that includes configuring a set of communication endpoints of an entity; distributing communication requests of an entity across the set of communication endpoints, comprising: receiving at least one communication request that specifies a set of destination endpoints; and for each of the set of destination endpoints, selecting a communication endpoint and establishing a communication with the destination endpoint from the selected communication endpoint.

19 Claims, 14 Drawing Sheets

Related U.S. Application Data

(60) Provisional application No. 62/243,795, filed on Oct. 20, 2015, provisional application No. 62/161,726, filed on May 14, 2015.

(58) Field of Classification Search
CPC ......... H04L 63/02; H04L 63/08; H04L 63/10; H04L 63/20; H04L 67/16; H04L 67/34; H04L 67/42; H04L 67/104; H04L 67/141; H04L 67/20; H04L 1/1671; H04L 29/06; H04L 29/12132; H04L 29/06027; H04L 29/12367; H04L 61/1552; H04L 65/1069; H04L 65/403; H04L 65/105; H04L 65/1043; H04L 65/80; H04L 65/102; H04L 12/1813; H04L 12/1818; H04L 12/1827; H04L 12/1877; H04L 12/803; H04L 12/06; H04L 12/56; H04L 12/66; H04L 12/2814; H04L 12/2818; H04L 51/06; H04L 69/24; H04L 47/80; H04L 47/125; H04L 41/0803; H04L 41/22; H04L 41/12; H04L 49/25; H04W 4/06; H04W 4/025; H04W 4/14; H04W 12/00; H04W 12/08; H04W 28/18; H04W 88/06
See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,184,421 B1* | 2/2007 | Liu ............... H04L 12/189 370/254 |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |

(56) References Cited

U.S. PATENT DOCUMENTS

| | | |
|---|---|---|
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B2 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |

(56) References Cited

U.S. PATENT DOCUMENTS

| | | |
|---|---|---|
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,237,086 B2 * | 1/2016 | Devdhar ............... H04L 45/00 |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 10,419,891 B2 | 9/2019 | Malatack et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0080736 A1 * | 6/2002 | Furukawa ............... H04L 45/00 370/328 |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0207683 A1 * | 11/2003 | Lempio ............... H04W 4/02 455/422.1 |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |

(56) References Cited

U.S. PATENT DOCUMENTS

| | | |
|---|---|---|
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0019622 A1* | 1/2007 | Alt ................... H04L 61/2578 370/352 |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0059307 A1* | 3/2008 | Fordyce, III ....... G06Q 30/0226 705/14.27 |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0023453 A1* | 1/2009 | Hu ......................... H04W 48/17 455/452.1 |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0022131 A1 | 9/2009 | Chen et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276520 A1* | 11/2009 | Weerakoon ........... H04L 67/101 709/224 |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2009/0323674 A1* | 12/2009 | Wunsch ................. H04M 7/003 370/352 |
| 2010/0027531 A1 | 2/2010 | Kurashima |
| 2010/0037204 A1 | 2/2010 | Lin et al. |
| 2010/0054142 A1 | 3/2010 | Moiso et al. |

(56) References Cited

U.S. PATENT DOCUMENTS

| | | |
|---|---|---|
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0029191 A1 | 11/2010 | Sanding et al. |
| 2010/0281108 A1 | 11/2010 | Cohen |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0014981 A1 | 6/2011 | Koren et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0102116 A1* | 4/2012 | Shi ............... H04L 67/1091 709/204 |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0017361 A1 | 7/2012 | Bleau et al. |
| 2012/0170726 A1 | 7/2012 | Schwartz |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0208532 A1* | 8/2012 | Liu ............... H04W 12/35 455/432.1 |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0157692 A1* | 6/2013 | Hall ............... H04W 4/06 455/456.3 |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0031070 A1* | 1/2014 | Nowack ........... H04L 29/06176 455/466 |
| 2014/0032587 A1* | 1/2014 | Sankar ............ G06Q 50/01 707/759 |

(56) References Cited

U.S. PATENT DOCUMENTS

| | | | |
|---|---|---|---|
| 2014/0058806 A1 | 2/2014 | Guenette et al. | |
| 2014/0064467 A1* | 3/2014 | Lawson | H04M 15/68 379/114.03 |
| 2014/0072115 A1 | 3/2014 | Makagon et al. | |
| 2014/0073291 A1 | 3/2014 | Hildner et al. | |
| 2014/0075451 A1* | 3/2014 | Anderson | G06F 9/546 719/313 |
| 2014/0095627 A1 | 4/2014 | Romagnino | |
| 2014/0101058 A1 | 4/2014 | Castel et al. | |
| 2014/0105372 A1 | 4/2014 | Nowack et al. | |
| 2014/0106704 A1 | 4/2014 | Cooke et al. | |
| 2014/0122600 A1 | 5/2014 | Kim et al. | |
| 2014/0123187 A1 | 5/2014 | Reisman | |
| 2014/0126715 A1 | 5/2014 | Lum et al. | |
| 2014/0129363 A1 | 5/2014 | Lorah et al. | |
| 2014/0153565 A1 | 6/2014 | Lawson et al. | |
| 2014/0185490 A1 | 7/2014 | Holm et al. | |
| 2014/0254600 A1 | 9/2014 | Shibata et al. | |
| 2014/0258481 A1 | 9/2014 | Lundell | |
| 2014/0269333 A1 | 9/2014 | Boerjesson | |
| 2014/0269364 A1* | 9/2014 | Knapp | H04L 41/0823 370/252 |
| 2014/0274086 A1 | 9/2014 | Boerjesson et al. | |
| 2014/0282473 A1 | 9/2014 | Saraf et al. | |
| 2014/0289391 A1 | 9/2014 | Balaji et al. | |
| 2014/0304054 A1 | 10/2014 | Orun et al. | |
| 2014/0317640 A1 | 10/2014 | Harm et al. | |
| 2014/0037251 A1 | 12/2014 | Fausak et al. | |
| 2014/0355600 A1 | 12/2014 | Lawson et al. | |
| 2014/0372508 A1 | 12/2014 | Fausak et al. | |
| 2014/0372509 A1 | 12/2014 | Fausak et al. | |
| 2014/0373098 A1 | 12/2014 | Fausak et al. | |
| 2014/0379670 A1 | 12/2014 | Kuhr | |
| 2015/0004932 A1 | 1/2015 | Kim et al. | |
| 2015/0004933 A1 | 1/2015 | Kim et al. | |
| 2015/0023251 A1 | 1/2015 | Giakoumelis et al. | |
| 2015/0026477 A1 | 1/2015 | Malatack et al. | |
| 2015/0066865 A1 | 3/2015 | Yara et al. | |
| 2015/0081918 A1 | 3/2015 | Nowack et al. | |
| 2015/0082378 A1 | 3/2015 | Collison | |
| 2015/0100634 A1 | 4/2015 | He et al. | |
| 2015/0119050 A1 | 4/2015 | Liao et al. | |
| 2015/0181631 A1 | 6/2015 | Lee et al. | |
| 2015/0236905 A1 | 8/2015 | Bellan et al. | |
| 2015/0281294 A1 | 10/2015 | Nur et al. | |
| 2015/0296526 A1* | 10/2015 | Behravan | H04W 24/02 370/329 |
| 2015/0365480 A1 | 12/2015 | Soto et al. | |
| 2015/0370788 A1 | 12/2015 | Bareket et al. | |
| 2015/0381666 A1* | 12/2015 | Rustogi | H04M 7/006 370/352 |
| 2015/0382240 A1* | 12/2015 | Hecht | H04L 69/18 370/316 |
| 2016/0011758 A1 | 1/2016 | Dornbush et al. | |
| 2016/0077693 A1 | 3/2016 | Meyer et al. | |
| 2016/0112475 A1 | 4/2016 | Lawson et al. | |
| 2016/0112521 A1 | 4/2016 | Lawson et al. | |
| 2016/0119291 A1 | 4/2016 | Zollinger et al. | |
| 2016/0127254 A1 | 5/2016 | Kumar et al. | |
| 2016/0142913 A1* | 5/2016 | Ghosh | H04W 12/50 726/5 |
| 2016/0149956 A1 | 5/2016 | Birnbaum et al. | |
| 2016/0162172 A1 | 6/2016 | Rathod | |
| 2016/0205519 A1 | 7/2016 | Patel et al. | |
| 2016/0226937 A1 | 8/2016 | Patel et al. | |
| 2016/0226979 A1 | 8/2016 | Lancaster et al. | |
| 2016/0234104 A1* | 8/2016 | Hoffmann | H04L 45/38 |
| 2016/0234391 A1 | 8/2016 | Wolthuis et al. | |
| 2016/0239770 A1 | 8/2016 | Batabyal et al. | |
| 2016/0337819 A1 | 11/2016 | Malatack et al. | |
| 2017/0105142 A1* | 4/2017 | Hecht | H04L 67/02 |
| 2017/0339283 A1 | 11/2017 | Chaudhary et al. | |
| 2018/0278558 A1* | 9/2018 | Matas | H04L 51/32 |
| 2018/0359347 A1* | 12/2018 | Karkkainen | H04M 1/575 |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 15/154,752, Examiner Interview Summary dated Mar. 7, 2019", 3 pgs.

"U.S. Appl. No. 15/154,752, Final Office Action dated Dec. 28, 2018", 26 pgs.

"U.S. Appl. No. 15/154,752, Non Final Office Action dated Jun. 12, 2018", 38 pgs.

"U.S. Appl. No. 15/154,752, Notice of Allowance dated May 8, 2019", 11 pgs.

"U.S. Appl. No. 15/154,752, Response filed Mar. 20, 2019 to Final Office Action dated Dec. 28, 2018", 13 pgs.

"U.S. Appl. No. 15/154,752, Response filed Sep. 12, 2018 to Non Final Office Action dated Jun. 12, 2018", 15 pgs.

"Archive Microsoft Office 365 Email I Retain Unified Archiving", GWAVA, Inc., Montreal, Canada, [Online] Retrieved from the internet: <http://www.gwava.com/Retain/Retain_for_Office_365.php>, (2015), 4 pgs.

"Complaint for Patent Infringement", *Telinit Technologies, LLC v. Twilio Inc* 2:12-cv-663, (Oct. 12, 2012), 17 pgs.

"Ethernet to Token ring Bridge", Black Box Corporation, [Online] Retrieved from the internet: <http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the internet: <http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

(56) References Cited

OTHER PUBLICATIONS

U.S. Appl. No. 15/154,752 U.S. Pat. No. 10,419,891, filed May 13, 2016, System and Method for Communicating Through Multiple Endpoints.

* cited by examiner

140

General    Communication Router

Communication router allows you to add delivery and localization intelligence to your application with the below delivery options

Delivery Options

| | | |
|---|---|---|
| Scaler | ☒ | Distribute outbound messages across your number pool to accommodate higher traffic |
| Shortcode Reroute | ☒ | Use a long code to deliver messages to minor carriers that do not accept short code messages |
| Sender Continuity | ☒ | Maintain the same "From" number each time you message a recipient |
| Geo-Match | ☐ | Maintain the same "From" number each time you message a Send from a phone number that matches the recipient's country. If a matching phone number is not available, an alternative number will be selected. |

Number Pool                                                                [ Add Number ]

| Number | Capabilities |
|---|---|
| +16305551234<br>Lombard, IL | voice, SMS, MMS |
| +12565557896<br>Hartselle, AL | voice, SMS |
| +15105552468<br>Oakland, CA | SMS, MMS |

FIGURE 2

Number Pool

| Number | Capabilities |
|---|---|
| +16305551234<br>Lombard, IL | voice, SMS, MMS |
| +12565557896<br>Hartselle, AL | voice, SMS |
| +15105552468<br>Oakland, CA | SMS, MMS |

Call Capacity:
3 Messages/second

[Add Number]

FIGURE 4

SYSTEM AND METHOD FOR COMMUNICATING THROUGH MULTIPLE ENDPOINTS

CROSS-REFERENCE TO RELATED APPLICATIONS

This Application is a continuation of U.S. patent application Ser. No. 15/154,752, filed on 13 May 2016, which claims the benefit of U.S. Provisional Application No. 62/161,726, filed on 14 May 2015, and U.S. Patent Application No. 62/243,795, filed on 20 Oct. 2015, all of which are incorporated in their entireties by this reference.

TECHNICAL FIELD

This invention relates generally to the communication field, and more specifically to a new and useful system and method for communicating through multiple endpoints in the communication field.

BACKGROUND

Numerous services and applications leverage text and media messaging (e.g., SMS and MMS) in communicating with customers. SMS and MMS enable a large number of people to be reached using existing telecommunication infrastructure. However, contacting a large volume of customers over SMS and MMS is limited by the messaging limits placed on such messaging systems. SMS messages sent from a longcode phone number are rate limited to only one message per second by carriers. Many applications require the ability to message a large number of people within a given time window. Thus, there is a need in the communication field to create a new and useful system and method for communicating through multiple endpoints. This invention provides such a new and useful system and method.

BRIEF DESCRIPTION OF THE FIGURES

FIG. 2 is an exemplary screenshot of an endpoint management portal;

FIG. 4 is an exemplary screenshot of an endpoint management portal with a capacity limit preview;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Communicating Through Multiple Endpoints

Figure 1:
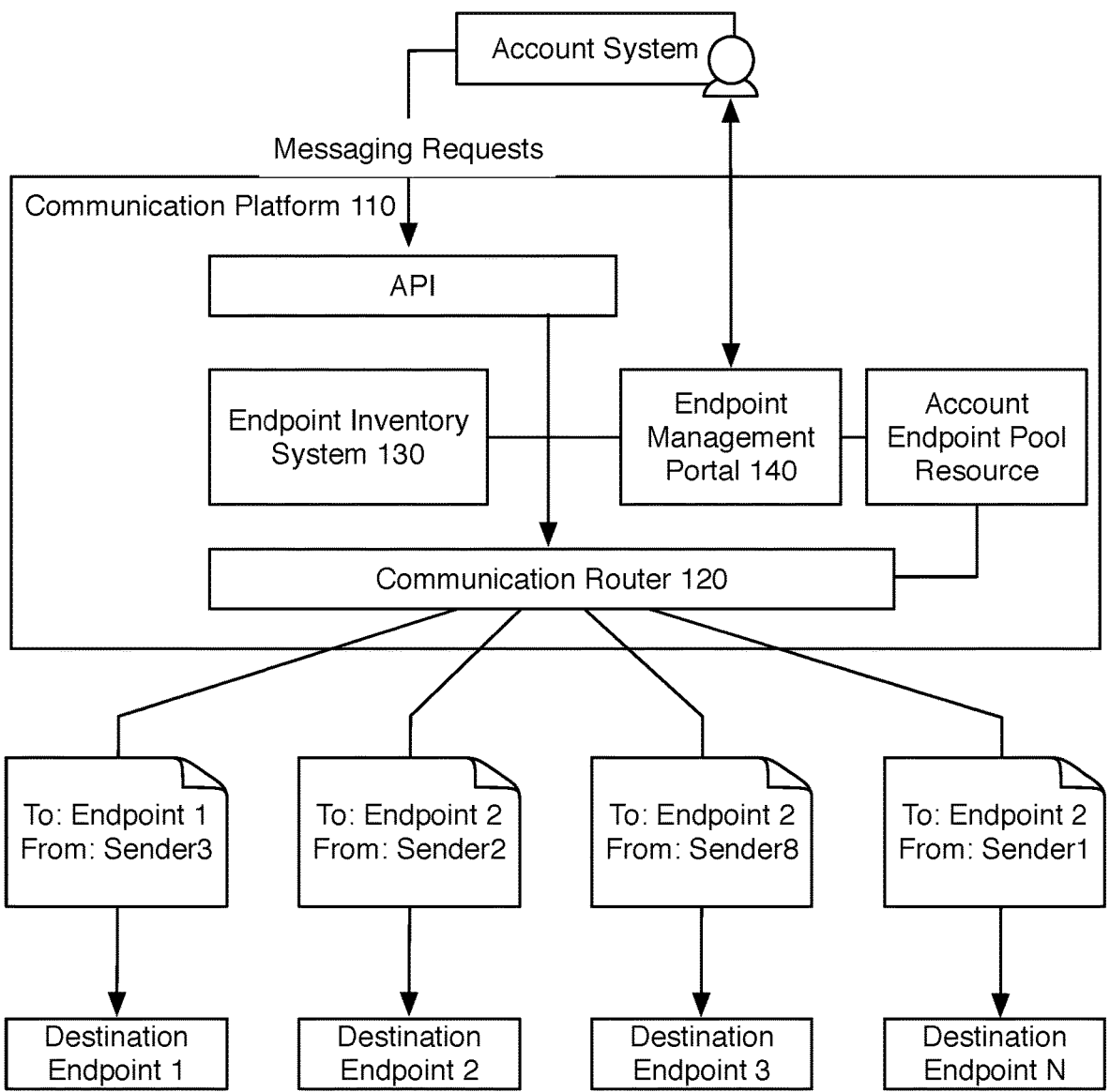
FIG. 1 is a schematic representation of a system of a preferred embodiment.

As shown in FIG. 1, a system for communicating through multiple endpoints can include a communication platform 110, a communication router 120, an endpoint inventory system 130, and an endpoint management portal 140. The system functions to enable a pool of telephony endpoints to be intelligently shared in establishing communications. The system is preferably used in sending messages but may additionally or alternatively be used for establishing synchronous media sessions such as voice or video calls. Herein, messaging is used as the main exemplary use case and is not in any way meant to limit the system or method to messaging. As one potential benefit of the system, the rate limits of outgoing communications for a single endpoint can be avoided by using fallback endpoints. An additional potential benefit is that a contextually appropriate endpoint can be selected for each destination endpoint. In one exemplary use-case scenario, the system is used by a customer building a messaging service that needs to reach a large number of participants. For example, an airline notification service may need to send a large number of messages in a short amount of time to inform passengers of flight changes. In another example, a social-commerce service may need to maintain messaging capacity while sending SMS and MMS messages to users throughout the day.

The communication platform 110 functions to provide communication services to developer applications and services. The system is preferably implemented in combination with a communication platform 110 such as the one described in patent application Ser. No. 12/417,630 filed 2 Apr. 2009, entitled "System and Method for Processing Telephony Sessions", which is hereby incorporated in its entirety by this reference. The communication platform 110 preferably enables application execution in connection to communication sessions and/or messages; the communication platform 110 may additionally or alternatively provide an application programming interface (API) as an alternative for interacting with communication functionality of the communication platform 110. The communication platform 110 can be designed for one or more mediums of communication. The communication platform 110 preferably includes SMS and MMS messaging capabilities, but may alternatively or additionally include other asynchronous messaging functionality and/or synchronous communication capabilities (e.g., PSTN calls, IP voice calls, IP video calls, screen sharing, and the like).

The communication platform 110 is preferably a multi-tenant communication platform that allows multiple entities to use the communication platform 110 in facilitating communication tasks. An entity can be an account, subaccount, or any suitable identifier for a party. The communication platform 110 can additionally be a cloud-hosted platform. The communication platform 110 can be a server, a server cluster, a collection of computing resources on a distributed computing system, or any suitable network accessible computing infrastructure. The system may alternatively be used in combination with a text or multi-media based messaging system, a video or voice chat system, a screen-sharing system, and/or any suitable communication platform 110.

The communication router 120 functions to send communications to a destination endpoint from an origin endpoint (i.e., sending endpoint). The communication router 120 can include an outbound communication transmission interface, from which outgoing communications are sent. The outgoing communications preferably include SMS and/or MMS messages, but may alternatively include IP Messages, third-party platform communications (e.g., social network messaging), voice calls, or any suitable medium of communication. The communication router 120 can additionally include an inbound communication interface through which inbound communications can be received and appropriately routed. The system can support managing inbound responses to outbound messages and/or responding to inbound new communications. The communication router 120 can include a number of communication route options, which may enable transmitting communications over varying protocols, to different regions, and with different telecommunication carrier services. The communication router 120 may support global communication to a plurality of countries and region. The communication router 120 may alternatively be limited to a select region and/or set of communication mediums.

The endpoint inventory system 130 functions to manage endpoint allocation and assignment for a set of entities. The communication platform 110 may manage a set of endpoints that can be assigned, allocated, and/or used by an entity. An entity within the communication platform 110 can preferably register with a set of endpoints. The endpoint inventory system 130 can enable a user to purchase or register different endpoints, and the endpoint inventory system 130 can enable a user to release or remove endpoints from their account. The endpoint inventory system 130 can manage a set of unallocated endpoints available for registration. A user can browse and select a set of endpoints to associate with an account. Endpoints may additionally or alternatively be ported in from outside registration. For example, an entity may onboard an existing, outside phone number into the endpoint inventory system 130 for using the phone number with the communication platform 110. Endpoints can be purchased through a programmatic interface (e.g., a REST API), a graphical user interface, and/or any suitable interface. The endpoint inventory system 130 may alternatively or additionally manage a set of shared endpoints, which may be used across a set of entities. The endpoint inventory system 130 can additionally include an autoallocation system, which may add endpoints to an account when particular conditions are satisfied. For example, an entity can pre-register for an endpoint with a particular number pattern, area code, or country code. When an endpoint becomes available the autoallocation system adds the endpoint to the entity. The autoallocation system can manage endpoint request queuing across multiple accounts, which functions to fairly assign endpoints across endpoints during autoallocation.

An endpoint is preferably a telephony address (e.g., a phone number). A telephony endpoint can be a longcode phone number, a short code, toll-free numbers, alphanumeric endpoints, or any suitable telephony address. The endpoints may be for a single country but can alternatively be for a set of different countries. Alternative types of endpoints may additionally be supported. Alternative endpoints may include email addresses, usernames for third-party communication service, or addressing information for any suitable communication channel. The endpoints may have associated communication restrictions and properties. A communication restriction can be a rate limit on how quickly messages can be sent within a short time frame (e.g., 5 messages per minute), a volume limit on total number of messages in a long time window (e.g., 100 messages in one hour), content limits, and/or any suitable restriction. Properties of an endpoint may include carrier, content encoding approach, and/or any suitable property.

The endpoint management portal 140 functions to enable an account to configure how a group of account endpoints can be cooperatively used in communicating. The endpoint management portal 140 is preferably used in setting up messaging endpoint pools as shown in FIG. 2. A messaging endpoint pool as described above enables messages to be transmitted using multiple endpoints in response to messaging requests or one bulk message from an account. A user can preferably create an endpoint pool resource. The endpoint pool resource includes a list of endpoints. The endpoint pool resource can additionally include endpoint distribution configuration such as endpoint prioritization, endpoint continuity configuration, geographic matching configuration, autoallocation configuration, shared pool configuration, and/or any suitable endpoint pool usage setting. Endpoint prioritization can determine the prioritization of an individual endpoint or a type of endpoint. For example, a short code endpoint can be prioritized ahead of a longcode endpoint. Endpoint continuity configuration enables an endpoint to default to a previously used origin endpoint if the destination endpoint has been previously contacted. When activated, geographic matching prioritizes endpoints based on matching country code, matching area code, or regional proximity of an endpoint. Autoallocation enables endpoints to be automatically added and/or deallocated from an endpoint pool to satisfy communication requirements. Shared pools can enable a shared pool of endpoints to be used to satisfy communication requirements when a pool of endpoints doesn't provide sufficient capacity. The endpoint pool resource is preferably accessed and used in instructing the communication router 120 in how to send communications. In one variation, the endpoint pool resource can be modified and updated over an API. In another variation, the endpoint pool resource can be modified and updated through a graphical user interface.

2. Method for Communicating Through Multiple Endpoints

Figure 3:
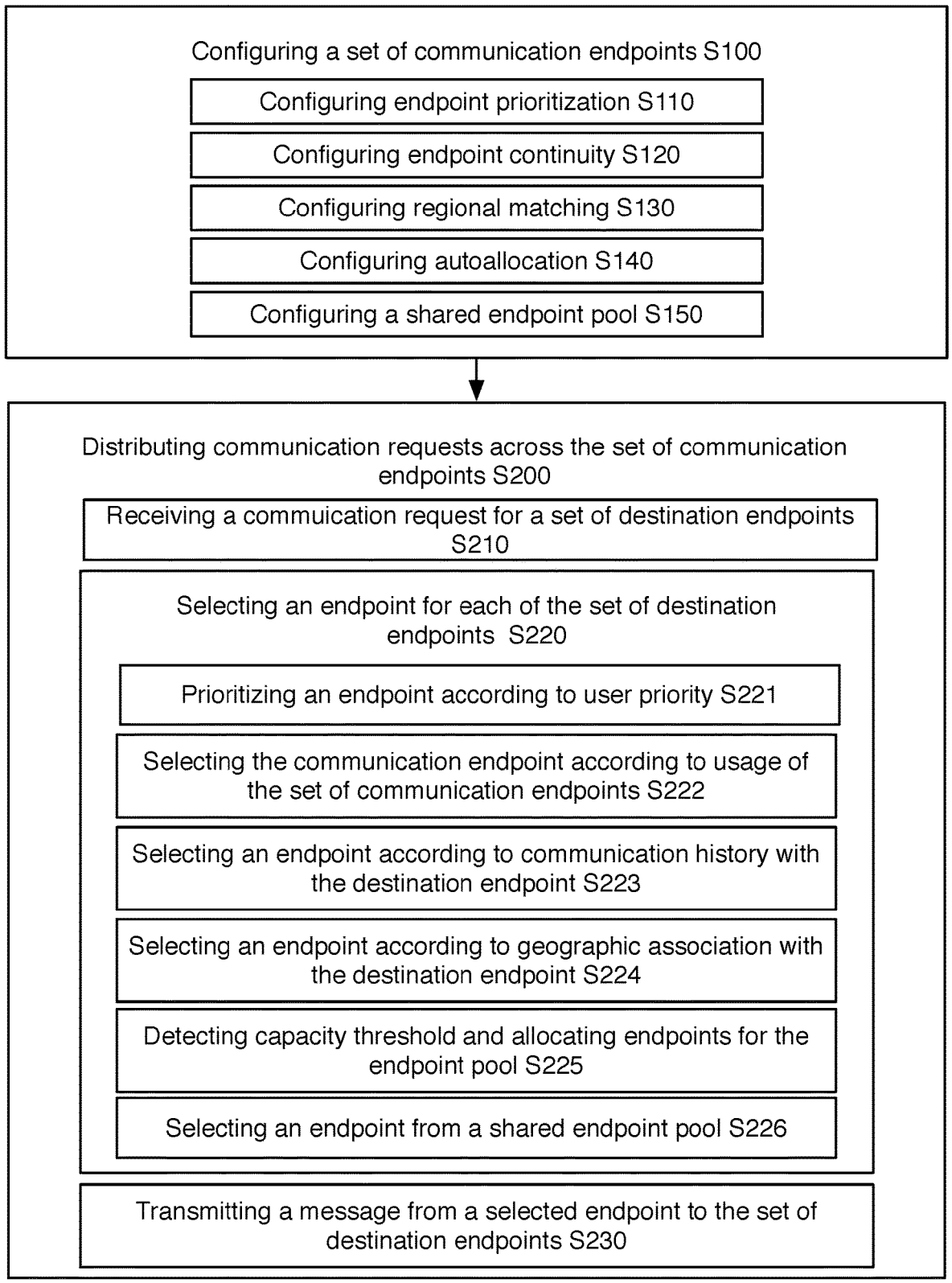
FIG. 3 is a flowchart representation of a method of a preferred embodiment.

As shown in FIG. 3, a method for communicating through multiple endpoints can include configuring a set of communication endpoints S100 and distributing communication requests across the set of communication endpoints S200. The method functions to enable a pool of telephony or communications endpoints to be intelligently shared in sending messages or establishing communications within a time window. The method is preferably applied within a multi-tenant communication platform. An entity of the platform (e.g., an account) can make multiple communication requests and/or one or more bulk communication requests. The method automates the process of determining which origin endpoint should be used in sending a communication to a particular destination. The method is preferably utilized with rate limited or usage restricted endpoints so as to avoid or mitigate restrictions. The method is preferably applied to SMS messaging, MMS messaging, and/or any suitable rate limited communication protocol. For example, SMS and MMS may have rate limits (e.g., number of messages per minute) and/or volume caps (e.g., total messages sent in one hour, day, or month). The method may additionally include variations that involve making automated calls, sending a message over a third-party communication protocol, or initiating any suitable type of communication. A call can be a PSTN voice call, a SIP call, an IP media call (voice, video, screen sharing, or data), or any suitable type of call. The method is primarily described as applying to messaging, but may alternatively be applied to other communication modes. The method can be used across a plurality of entities. Each entity can have a unique configuration for a set of communication endpoints. The method can be implemented by the system above, but any suitable system may be used.

Block S100, which includes configuring a set of communication endpoints, functions to setup a group of endpoints that can be used in sending messages to a plurality of destinations. An entity can configure an endpoint pool resource with a set of account managed communication endpoints, which may be owned, rented, or otherwise controlled endpoints. Configuring a set of communication endpoints preferably includes adding a subset of entity endpoints to an endpoint pool. An endpoint pool can be a referencable resource (e.g., an identifiable REST API resource), an account setting, or any suitable data construct. In one variation, an entity may configure a single endpoint pool associated with the entity. Alternatively, an entity may configure multiple endpoint pools wherein each endpoint pool can have distinct and customized configuration. The set of communication endpoints in an endpoint pool can include local endpoints, longcode endpoints, endpoints from multiple area codes, endpoints with multiple country codes, shortcodes, alphanumeric endpoints, and/or any suitable type of endpoint address. Configuration of the endpoint pool is preferably made through a website but may alternatively be made through an application or a programmatic interface (e.g., REST API).

A programmatic interface is preferably a RESTful API but may alternatively be any suitable API such as SOAP or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as referenced objects that can act as a mechanism for specifying requested information or requesting particular actions. The resources can be expressed as URI's or resource paths. The RESTful API resources can additionally be responsive to different types of HTTP methods such as GET, Put, POST and/or DELETE. An entity may create and configure an endpoint pool by making a HTTP requests. Similarly, an entity may request a new communication by referencing the endpoint pool when making an HTTP request.

An account holder preferably adds a sufficient number of endpoints to satisfy expected messaging capacity requirements. The method may include presenting a preview of communication capacity capabilities in response to configuring a set of communication endpoints, which functions to provide user feedback for evaluating capacity capabilities of an endpoint pool. Presenting a preview may include simulating and/or calculating limits, which are presented in a report as shown in FIG. 4. In one variation, basic capacity information can be evaluated and reported through an endpoint management portal. For example, as a user adds endpoints to the endpoint pool, a call capacity meter may increase. The call capacity may be number of messages that can be transmitted in a set time window (e.g., one hour). In another variation, a user may specify a specific messaging scenario, which may include the number of messages and a time window. The messaging scenario may additionally specify geographic region. The communication capacity of the endpoint pool for the user specified messaging scenario could be similarly presented. A preview of communication capacity capabilities can include global or general communication capacity and/or regional capacity.

Preferably, an endpoint pool is configured by an entity explicitly adding communication endpoints to the endpoint pool. In one alternative approach, an entity could configure the set of communication endpoints by specifying communication capacity guidelines. In this alternative approach, configuring a set of communication endpoints can include receiving communication capacity guidelines and automatically allocating communication endpoints to the set of communication endpoints. Automatically allocating communication endpoints selects recommended communication endpoints such that as a set the communication endpoints are better equipped to satisfy the communication capacity. A set of communication endpoints can additionally be configured through a mixture of the two approaches where a subset of communication endpoints are specifically added while a second subset are automatically allocated to the entity (e.g., purchased or otherwise assigned) and added to the set of communication endpoints.

Configuring an endpoint pool with a set of communication endpoints can additionally include configuring endpoint distribution configuration, which functions to define the capabilities and process of distributing communication requests. Configuring an endpoint distribution configuration may include configuring endpoint prioritization S110, configuring endpoint continuity S120, configuring regional matching S130, configuring autoallocation S140, and/or configuring a shared endpoint pool S150. An account holder or other administrator of an entity can enable various features and optionally set operating parameters of an endpoint distribution configuration. Some or all of the endpoint distribution configurations may be set by default and some may be configured by a second party such as the communication platform.

Configuring endpoint prioritization S110 functions to set prioritization of different endpoints or types of endpoints. In one variation, a user can configure shortcode prioritization wherein shortcodes are automatically prioritized over longcodes. Similarly, alphanumeric endpoints may be prioritized relative to shortcodes and longcodes. A user may alternatively individually specify the prioritization of a subset or all endpoints in the endpoint pool. Prioritization of endpoints may be predefined in the business logic of distributing communication requests across the set of communication endpoints.

Configuring endpoint continuity S120 functions to reuse the same origin endpoint for contacting a destination endpoint that previously received a communication from the account. Use of an origin endpoint can be made "sticky" for a destination address—the same origin endpoint can be used when contacting a destination address multiple times. Endpoint continuity makes for a consistent experience to recipients of communications. For example, when a company sends a communication to a particular destination endpoint, the same origin endpoint for subsequent communications is used. Endpoint continuity can be enabled or disabled. Endpoint continuity can additionally be enabled or disabled for various subsets or types of destination endpoints. Endpoint continuity may be prioritized during the selection of an endpoint. For example, in one implementation, endpoint continuity may be broken when a regional matched endpoint is available during a subsequent communication. For example, the first time a customer is contacted the endpoint may have a limited number of endpoints. More endpoints may be added after the first message. A subsequent message may use an endpoint with a closer regional proximity to the destination. In another exemplary implementation, continuity may be prioritized above regional matching.

There may be scenarios where a destination endpoint may not receive a communication from a consistent endpoint even when endpoint continuity is active. For example, the last used origin endpoint may be at capacity and can't be used. As a result a destination endpoint may have been contacted by the entity through a plurality of different origin endpoints Various operating modes may be used during endpoint continuity such as last used mode, first used mode, most used mode, geographically nearest mode, and best fit mode.

In a last used mode, an attempt is made to maintain endpoint continuity based on the last used origin endpoint. If the new origin endpoint has to be used, then that new origin endpoint will be prioritized the next time. Last used mode can be implemented by storing the last used endpoint.

In a first used mode, endpoint continuity prioritizes the first endpoint used to contact a recipient.

In a most used mode, the origin endpoint used the most when contacting a recipient is prioritized.

In a geographically nearest mode, an origin endpoint from all the previously used origin endpoints is prioritized based on geographically proximity or association to the destination endpoint.

In a best fit mode, an origin endpoint of the set of previously used origin endpoints is prioritized based on some set of heuristics such as geographic association, order of usage, frequency of usage.

The endpoint continuity may be stored and made accessible as a programmatic resource. In one variation, the endpoint continuity may be inspected, changed, and/or deleted (i.e., reset).

Configuring regional matching S130 functions to bias endpoint selection based on regional proximity to a destination endpoint. Regional matching can be a binary feature. When enabled, regional matching is applied in block S200. When disabled, there is no regional matching. Alternatively, there may be conditional regional matching. In one variation, the regional matching includes a regional threshold wherein regional matching is only used if an origin endpoint can be used with a regional association satisfying some proximity condition. A proximity condition could include a defined set of acceptable area or country codes. In the extreme example, the country code and area code of the origin endpoint must match the country and area code of the destination endpoint. A proximity condition can be based on displacement between the associated geographic regions. For example, regional matching is used if an origin endpoint can be used if one within fifty miles is available, and otherwise any endpoint may be used.

Regional matching may include various approaches. There can be country matching, which biases endpoint selection towards endpoints with the same country code. There can be area code matching, which biases endpoint selection towards endpoints with the same country code. There can be closest proximity matching, which biases endpoint selection towards area codes or country codes nearest to a region associated with the destination endpoint.

Configuring autoallocation S140 functions to allow the set of endpoints in an endpoint pool to be increased or decreased automatically. When enabled, autoallocation will result in automatic allocation of endpoints for an account to satisfy messaging capacity requirements. Autoallocation can additionally release endpoints when the endpoints are no longer needed. Similarly, a shared endpoint pool can be enabled through block S150, which enables messages for an account to use origin endpoints that are part of a maintained pool of shared endpoints. The shared endpoints can be shared by two or more accounts.

Block S100 may additionally enable other aspects of an endpoint pool to be configured. For example, the response to a text reply can be configured. A text reply may be used in selecting different options or issuing a command. For example, a message recipient may reply with "STOP". The response to the reply of "STOP" may be defined across all endpoints of the endpoint pool.

Block S200, which includes distributing communication requests across the set of communication endpoints, functions to use the set of communication endpoints and their configuration to send messages to a set of different destinations. The configuration of the set of communication endpoints is preferably invoked to determine how outbound communication requests are transmitted. In a low capacity scenario, a high priority endpoint can be selected. When the number of communications (e.g., messages sent) begins exceeding the communication restrictions (e.g., messaging rate) of a single endpoint, alternative endpoints from the endpoint pool are selected and used to send a communication. By distributing communications across multiple endpoints, messages can be transmitted at a rate exceeding that of the communication restrictions for an individual endpoint. Distributing communication requests across the set of communication endpoints can include receiving a communication request for a set of destination endpoints S210, selecting a communication endpoint for each of the set of destination endpoints S220, and establishing a communication to a destination endpoint from the associated selected communication endpoint S230. The communication can be made agnostic to the particular origin endpoint. The method can dynamically determine an appropriate origin endpoint based on various rules and configurations for an endpoint pool of an entity.

Figure 5:
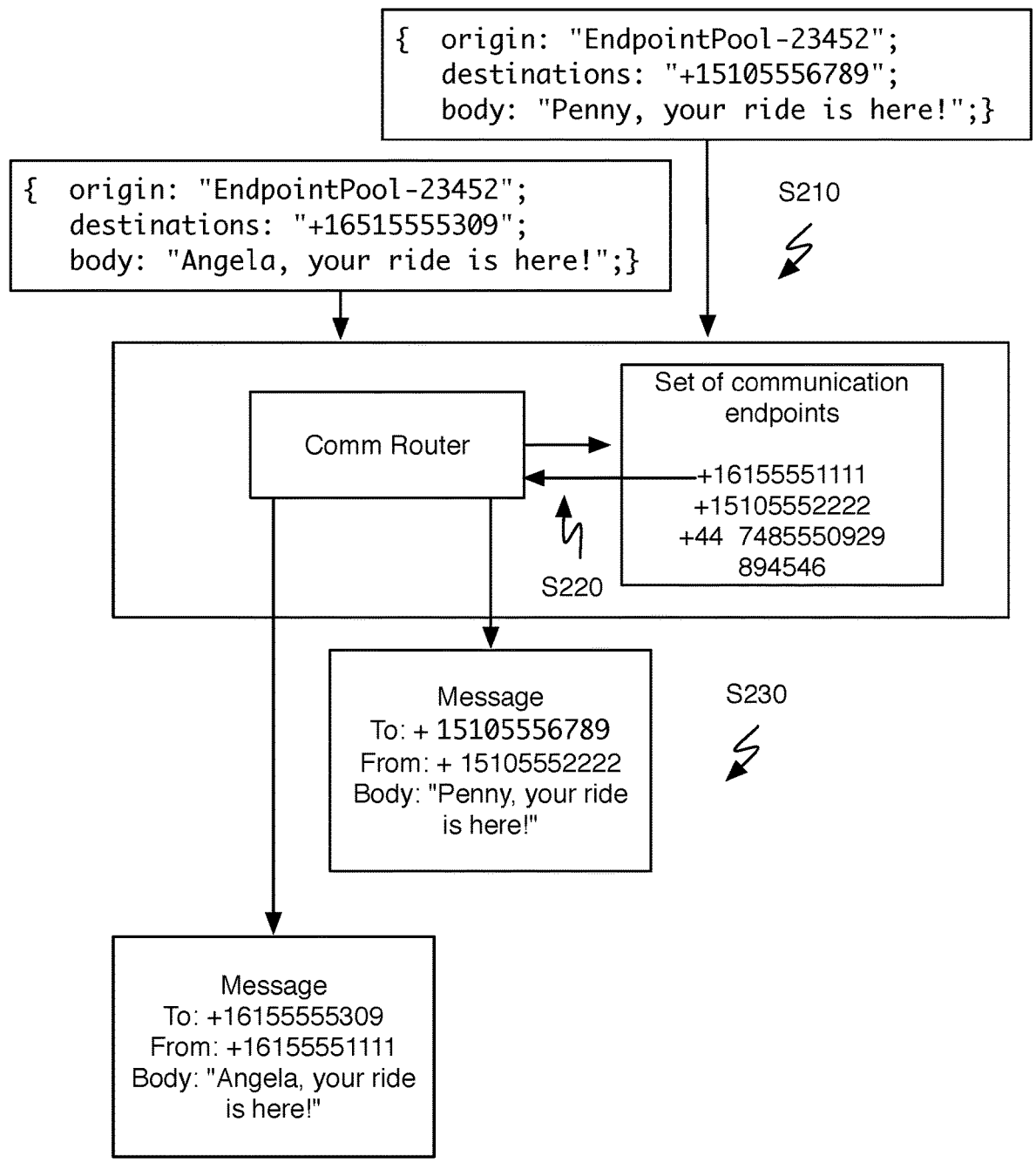
FIG. 5 is a schematic representation of a variation of the method wherein multiple communication requests are received.
Figure 6:
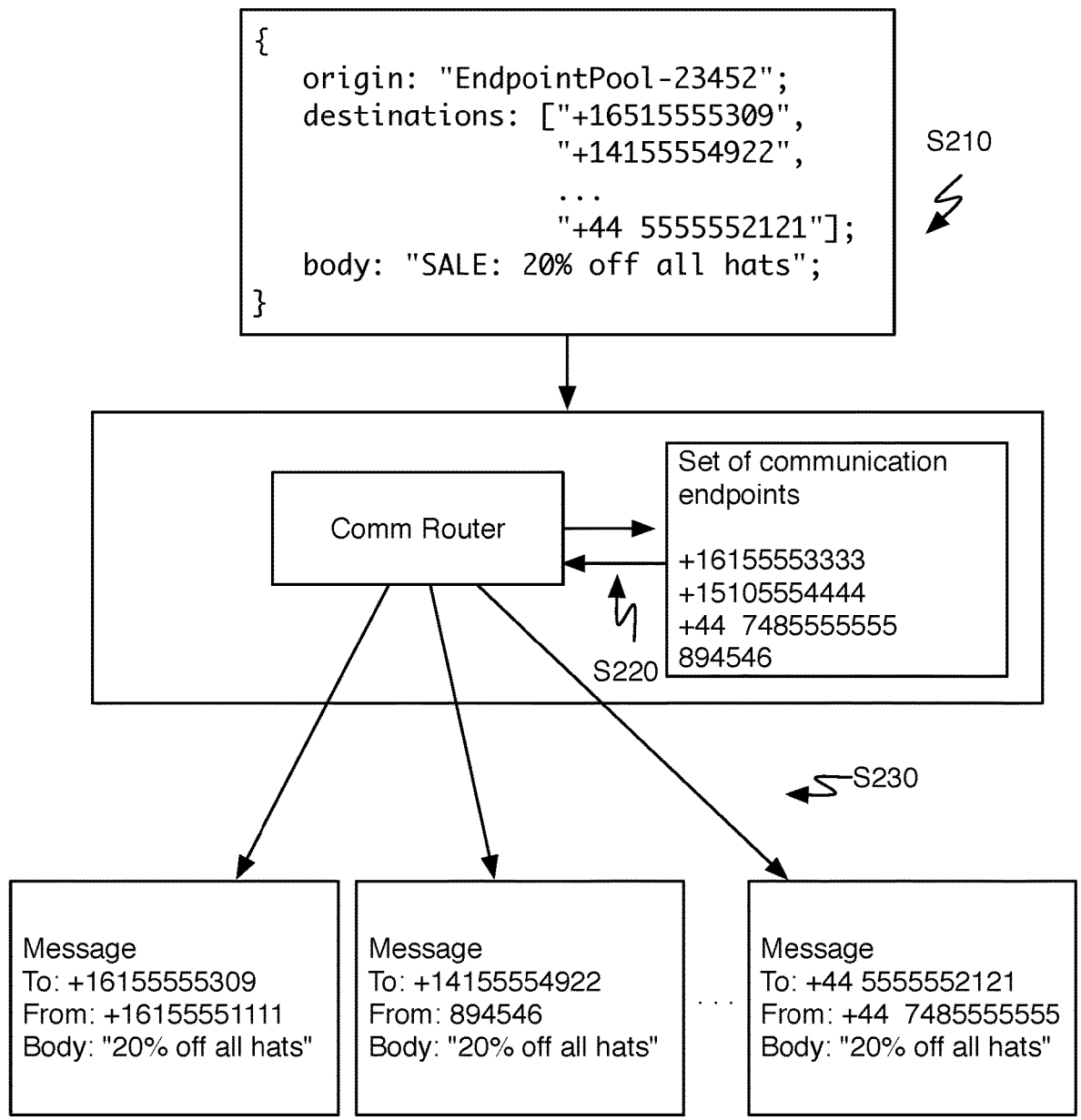
FIG. 6 is a schematic representation of a variation of the method wherein one communication request specifies multiple destinations are received.

Block S210, which includes receiving a communication request for a set of destination endpoints, functions to initiate a plurality of outbound messaging requests. A communication request can be an asynchronous messaging request that specifies at least one destination endpoint and content to be communicated to multiple destination endpoints. A messaging request may correspond to an SMS, MMS, or IP messaging request. The message content can be a text body, a media file, multimedia, or any suitable form of content. A communication request could alternatively be synchronous communication request that specifies at least one destination endpoint. A synchronous communication request may establish a voice call, a video call, a screen sharing session, or any suitable real time communication session. In one variation, a set of communication endpoints is referenced through an endpoint pool resource identifier. For example, a programmatically received messaging request may include the destination endpoint(s), the content, and an endpoint pool identifier as shown in FIGS. 5 and 6.

The method can preferably be used in a variety of scenarios where multiple communications need to be established. Multiple distinct communication requests may be received from an entity over a set time period as shown in FIG. 5. The distinct communication requests may have different message content. The method can enable automatic distribution of communications according to the configuration of the set of communication endpoints. Additionally or alternatively, a single communication request may direct multiple, distinct communications to be established with multiple destination endpoints, where the single communication request functions as a bulk communication request as shown in FIG. 6. The method can additionally handle a combination of multiple communication requests wherein a subset of the communication requests are bulk communication requests.

In one variation, a communication request may include a request expiration property. A request expiration property functions to define the time that the request should be active. An expiration property is preferably a time window. A request expiration property may alternatively be any suitable testable condition. An entity may include a request expiration property when a bulk messaging request is only relevant if sent within a short time window. Any messages not sent after the time window will be canceled and not sent.

Figure 7:
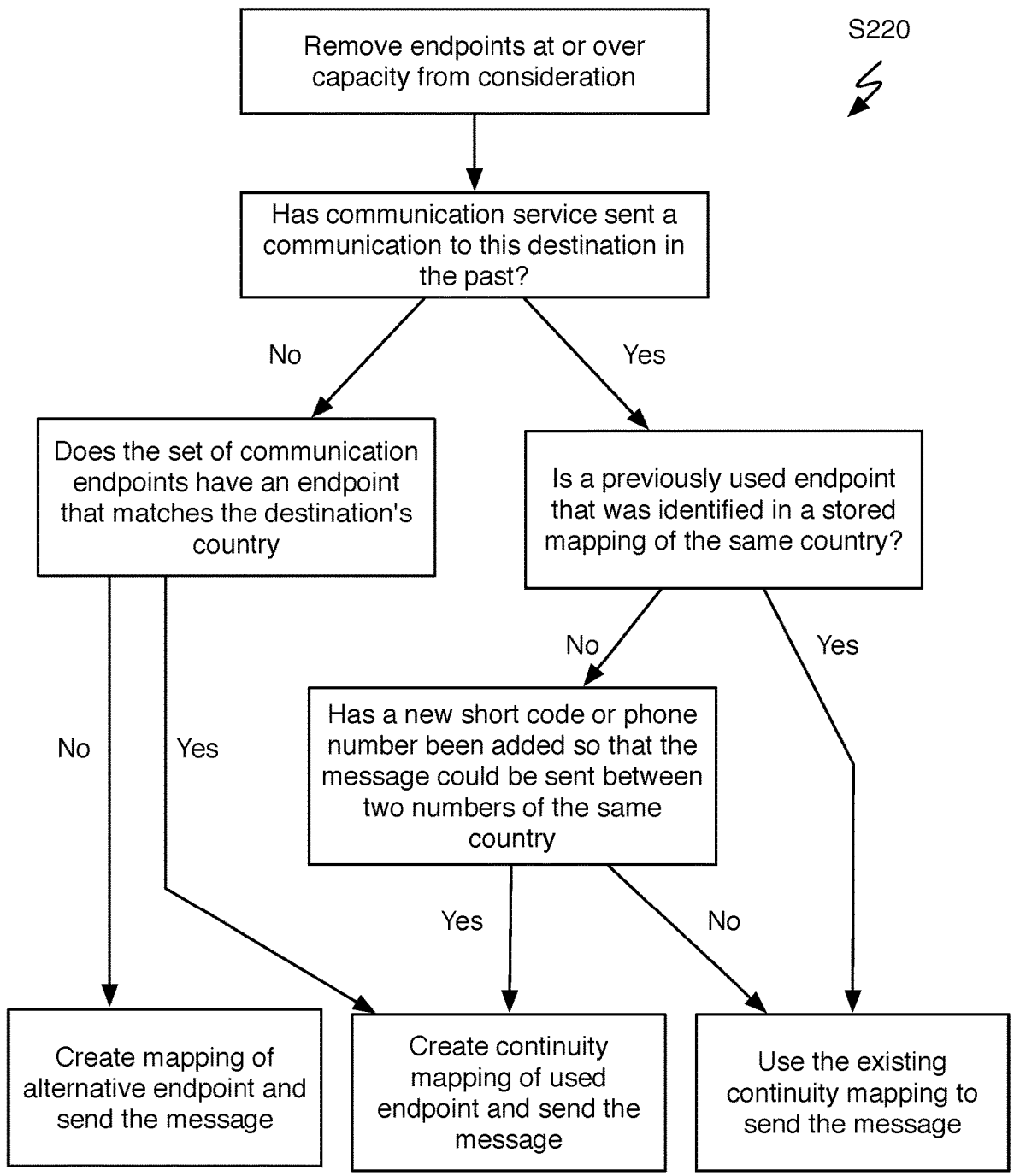
FIGS. 7-10 are flowchart representations of variations of selecting a communication endpoint.
Figure 8:
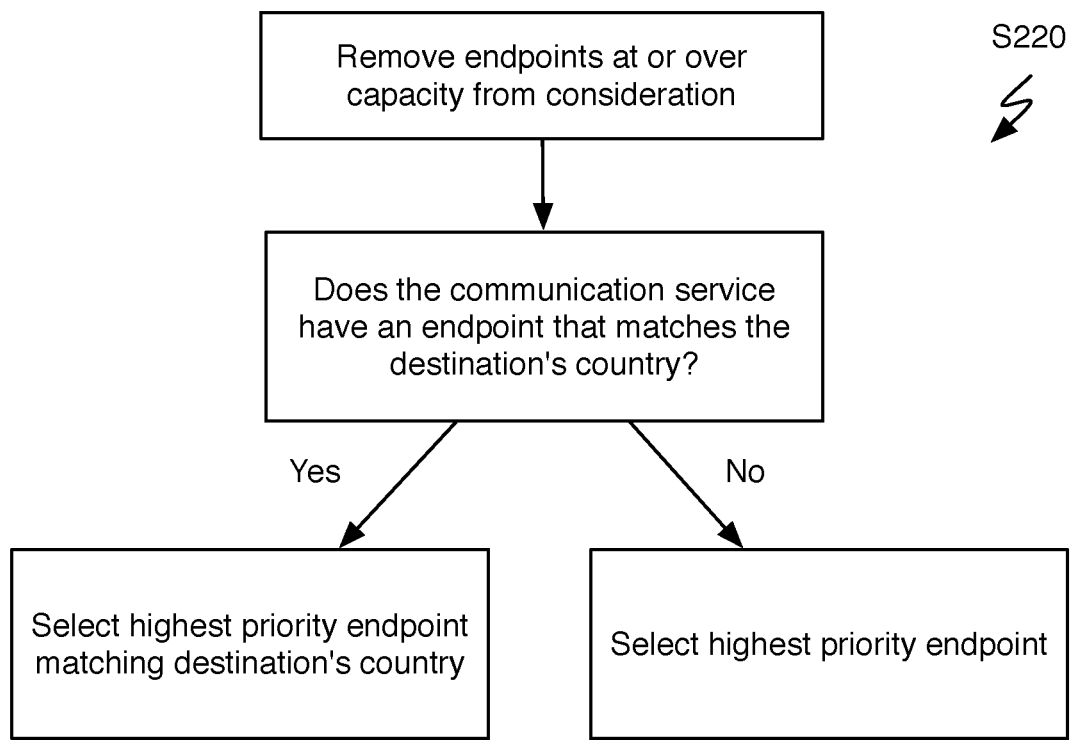
Figure 9:
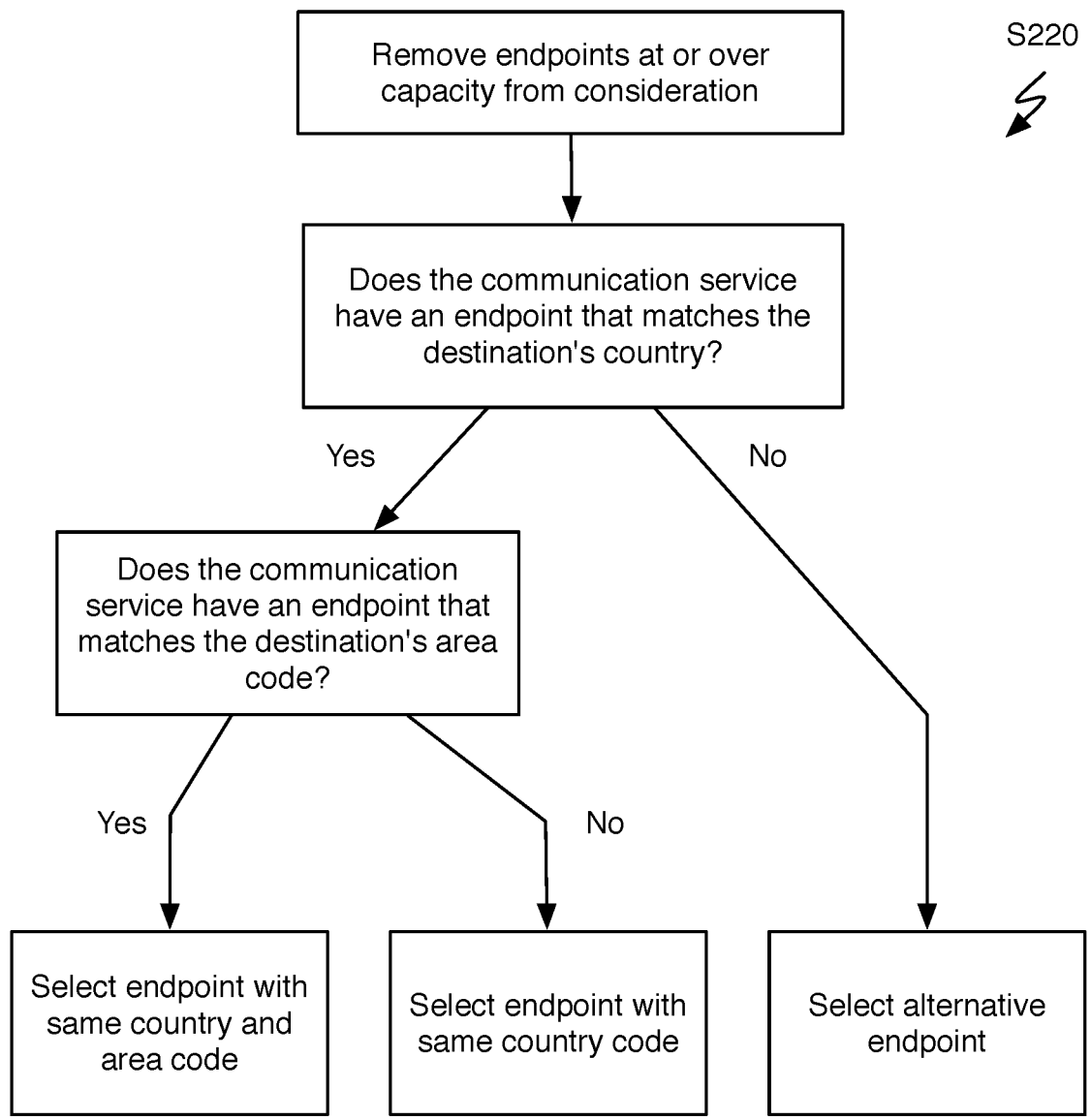
Figure 10:
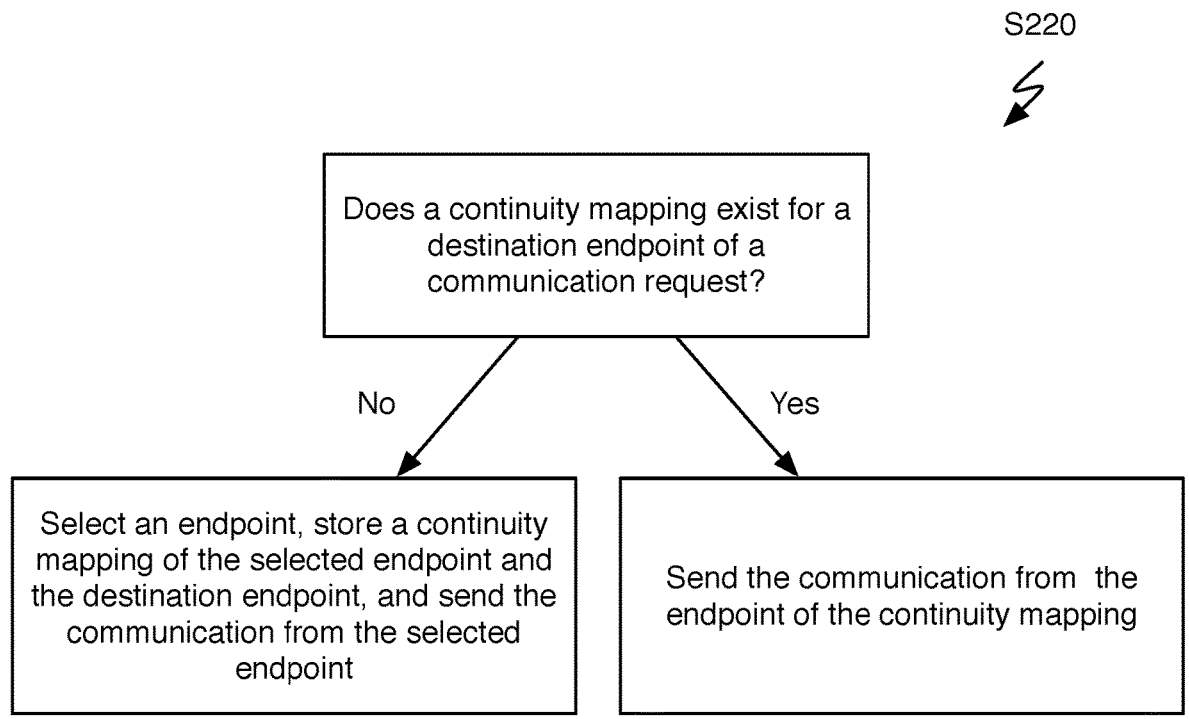
Figure 11A:
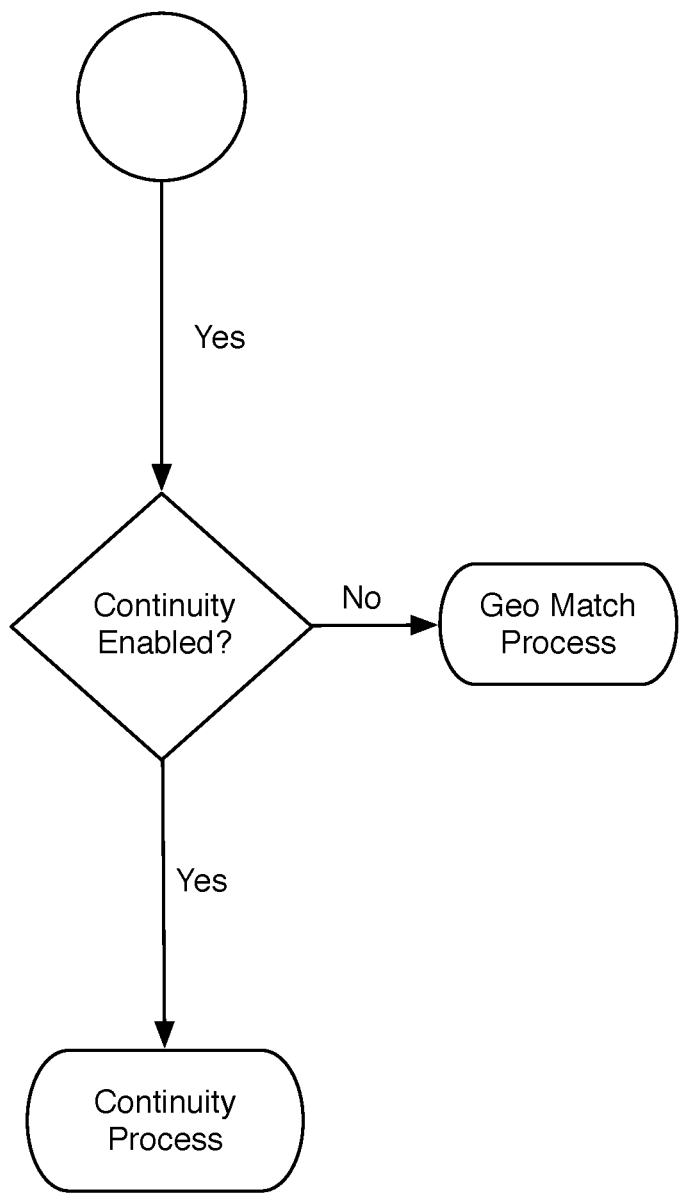
FIGS. 11A-11D are detailed flowchart representations of an exemplary selection heuristic.
Figure 11B:
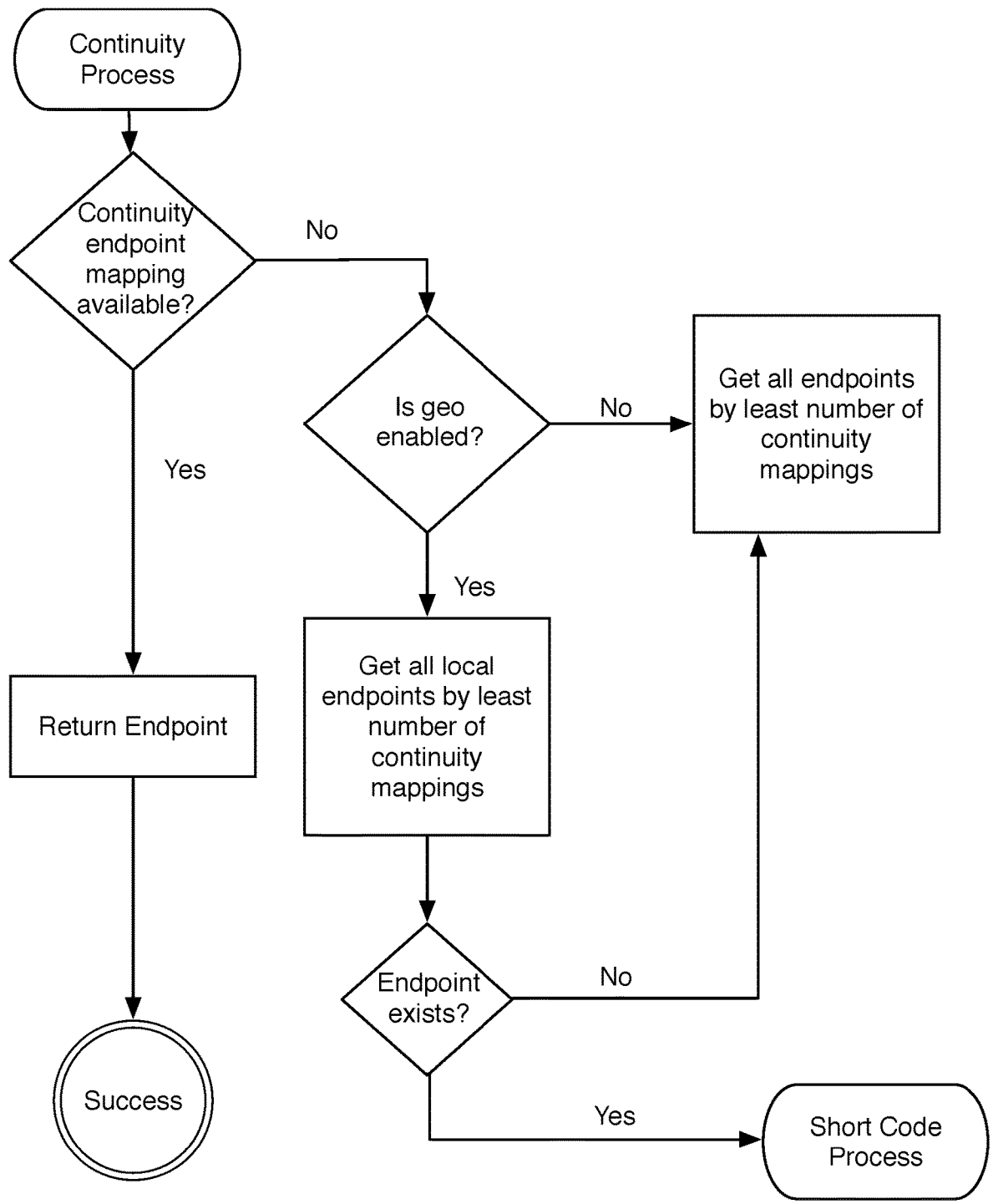
Figure 11C:
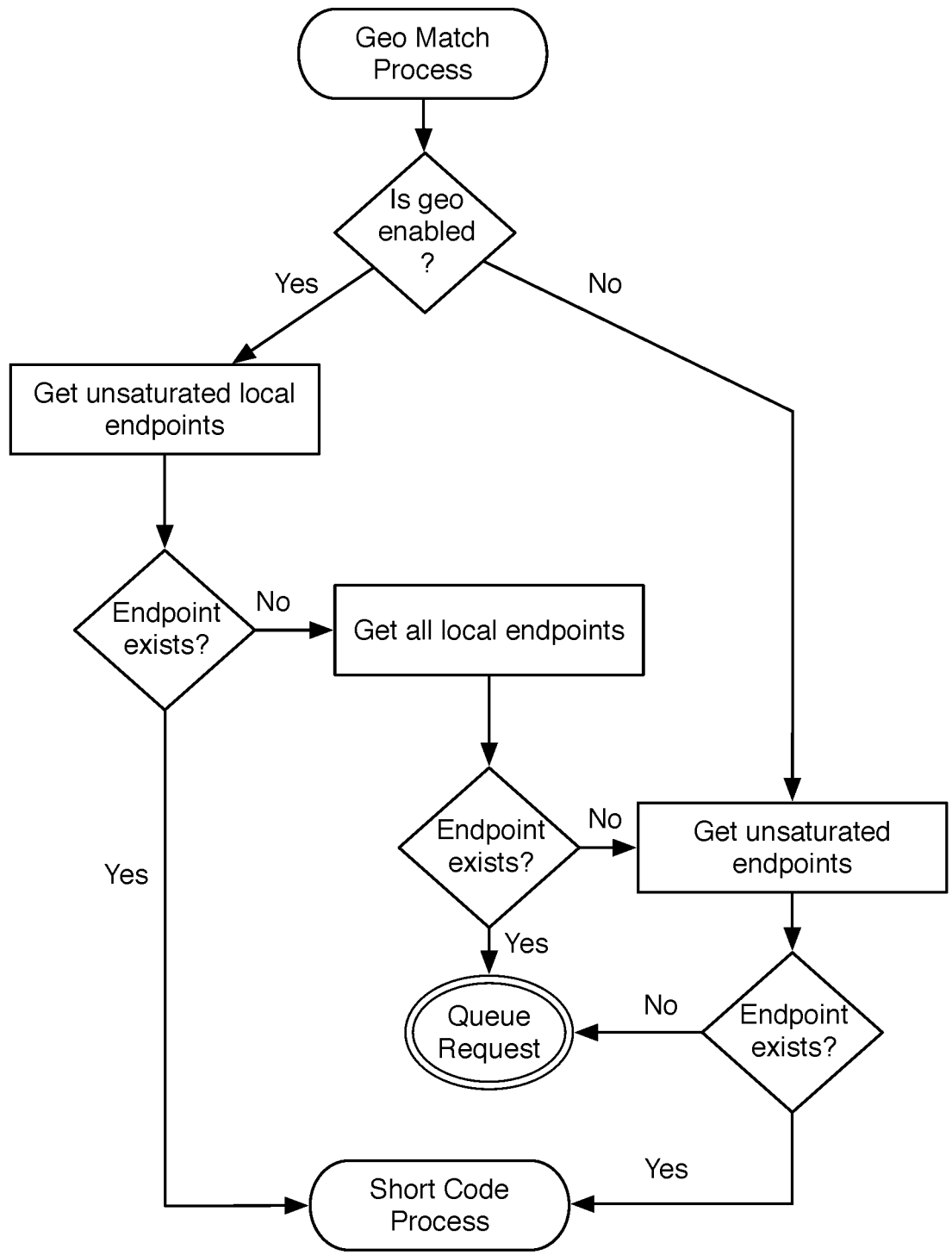
Figure 11D:
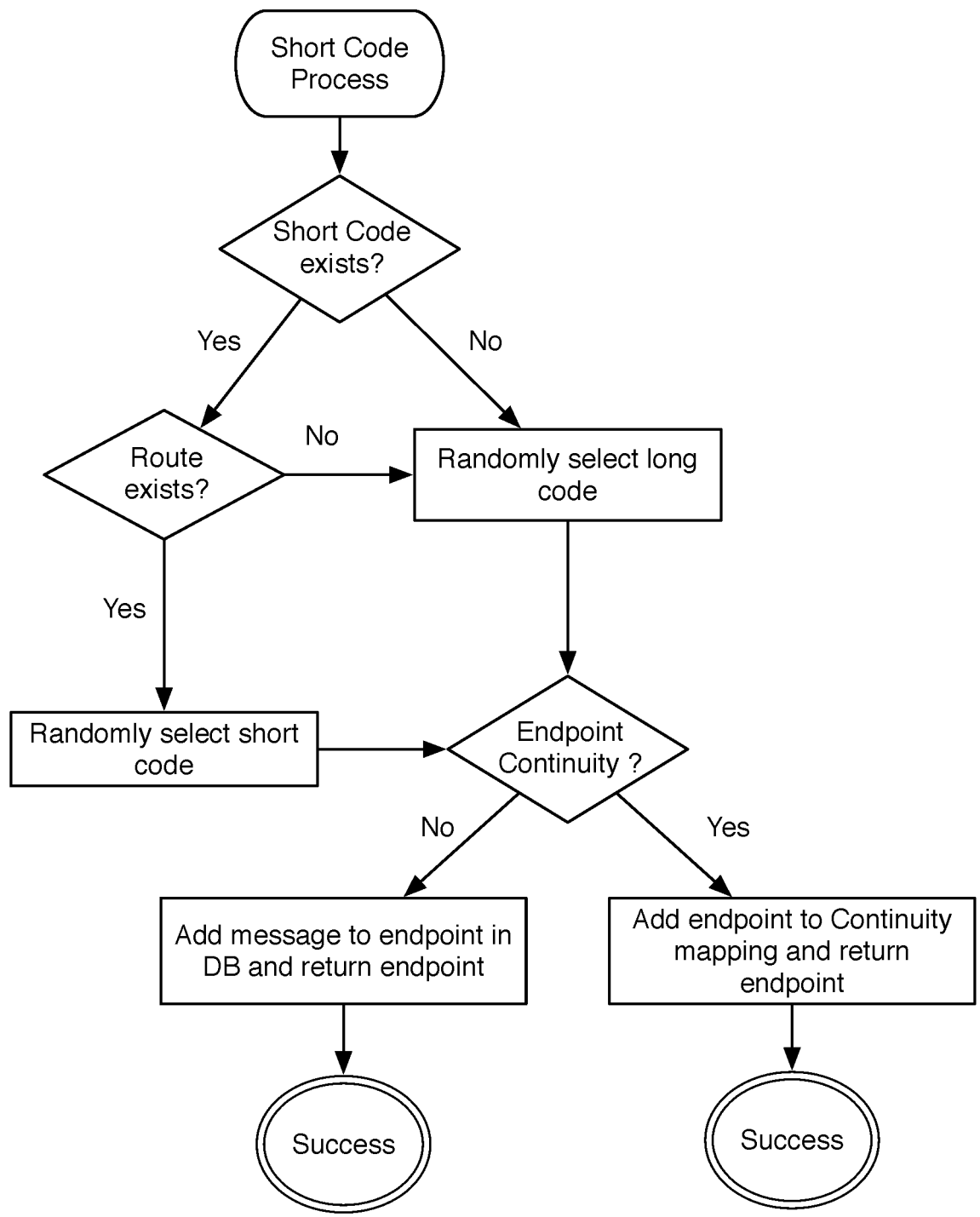

Block S220, which includes selecting a communication endpoint for each of the set of destination endpoints, functions to select preferred endpoints while distributing endpoint usage to avoid rate limiting, create a consistent communication experience, or promote other benefits from intelligent origin endpoint selection. The configuration of the set of communication endpoints of an entity is preferably used in determining the process of selecting an endpoint. As described, an endpoint pool resource (or any suitable reference to configuration of the set of communication endpoints) may be made. Alternatively, the configuration may be directly associated with the entity making the request such that no explicit reference to the configuration may be required in the request. In addition to configuration, properties of a destination endpoint and communication history may be used. Any suitable processing and logic may be used. The various selection processes and/or any suitable alternative processes may be used in any suitable process. Preferably, selecting a communication utilizes endpoint continuity, endpoint prioritization, regional matching, and usage balancing as shown in FIG. 7. Alternative approaches may use alternative combination of processes such as: a variation with usage balancing, regional matching, and endpoint prioritization as shown in FIG. 8; a variation with usage balancing and two tiered regional matching shown in FIG. 9; a variation with only endpoint continuity as shown in FIG. 10.

As shown in a detailed representation of FIGS. 11A-11D, one implementation may initially prioritize endpoint continuity (i.e., "stable sender"), then geographic matching, shortcodes, and last longcode endpoints. In this detailed implementation a communication endpoint is preferably selected according to the communication history with the destination endpoint if continuity mapping (e.g., a communication history record) exists indicating that the destination endpoint previously participated in a communication with a communication. If such a continuity mapping does not exit (e.g., a destination endpoint did not previously participate in a communication with a communication endpoint of the entity or that endpoint is not available), a communication endpoint can be selected based in part on geographic association and endpoint type prioritization. First, the country of the destination endpoint is attempted to be matched. If the country can be matched, the area code may optionally be matched. When multiple endpoints are available for selection after regional matching, short code endpoints and/or other endpoint types may be prioritized for selection.

The selection heuristics may additionally factor in alphanumeric endpoints, user specified endpoint preference, destination endpoint properties, or other suitable factors. Selecting an endpoint can include several variations including prioritizing a communication endpoint according to user priority S221, selecting the communication endpoint according to usage of the set of communication endpoints S222, selecting an endpoint according to communication history with the destination endpoint S223, selecting an endpoint according to geographic association with the destination endpoint S224, detecting capacity threshold and allocating endpoints to the set of communication endpoints S225, and/or selecting an endpoint from a shared endpoint pool S226.

Prioritizing a communication endpoint according to user priority S221 functions to apply user preference in selecting a particular endpoint. In one variation, a user may rank endpoints by selection priority. One or more communication endpoints can receive some priority score that can be determined the order in which the communication endpoint selection will be appointed. For example, a user can specify what top three endpoints should receive priority when there is available capacity. A communication endpoint can alternatively or additionally be prioritized according to the type of endpoint or any suitable trait of the endpoint. A user can define customized selection rules, which can depend on any suitable factor. Default prioritization may additionally be used. For example, short codes are prioritized such that a short code is selected before a longcode when possible.

Selecting the communication endpoint according to usage of the set of communication endpoints S222 functions to load balance communications across the set of communication endpoints. The method can include monitoring usage of the set of communication endpoints. Preferably usage is monitored relative to usage restrictions. For example, a communication endpoint may have messaging metrics monitored to determine if the communication endpoint is nearing or exceeding various rate limits or volumes. Some usage restrictions can be based limitations from outside parties such as carriers or internal restrictions of the platform. When selecting a communication endpoint for a particular destination, the usage history of a communication endpoint is evaluated and used in determining if a communication endpoint is eligible for selection. Communications near or over usage restrictions are preferably considered ineligible. Additionally, communication endpoints with low usage may be prioritized for selection to balance usage across the set of communication endpoints. Other selection criteria such as user priority, communication continuity and other rules may additionally be considered in determining the exact approach to how usage is considered.

Selecting an endpoint according to communication history with the destination endpoint S223, functions to apply the endpoint continuity (i.e., "stable sender") configuration. Endpoint selection can b based on communication history for a destination endpoint that previously participated in communication with a communication endpoint of the entity. If endpoint continuity is enabled, a sender record is maintained that indicates which endpoint is used for the previously messaged destination endpoints. For subsequent message requests, the sender record for a destination endpoint can be queried. If a sender record exists for the destination endpoint, that same origin endpoint can be attempted to be used again. The origin endpoint may not be eligible in some situations depending on usage and other factors. If the destination is a new destination (i.e., there is no sender record), the endpoint selection can be based on other selection heuristics. An additional check may be performed to ensure that the previously used endpoint is still a valid endpoint for the endpoint pool. For example, an endpoint may be removed from an endpoint pool in between two messages to a destination endpoint. Alternatively, the sender records can be updated when an endpoint is removed from an endpoint pool. In some variations, a new endpoint may be used when a previously used endpoint is at capacity. In another variation, the message may be delayed until the previously used endpoint is available for use. As discussed, there may be various modes of communication continuity such as a last used mode, a most used mode, a geographically nearest mode, or a best fit mode. For example, communication continuity may be used in combination with geographic association so that a communication endpoint the nearest communication endpoint previously used to contact a destination endpoint is prioritized for selection.

Selecting an endpoint according to geographic association with the destination endpoint S224, functions to select an origin endpoint that is associated with a nearby or same geographic region as the destination endpoint. In one variation, the subset of endpoints with the same country code as the destination is considered for selection. In another variation, the subset of endpoints with the same area code as the destination endpoint is considered for selection. In yet another variation, the set of endpoints in the endpoint pool may be prioritized for selection based on geographic proximity. For example, if a destination endpoint has the area code 415 (near San Francisco) then a 510 area code (near Oakland) will be higher priority than a 917 area code (near New York City).

Detecting a capacity threshold and allocating endpoints to the set of communication endpoints S225 functions to autoallocate endpoints. Automatic allocation is preferably performed when autoallocation is activated in an endpoint pool configuration. Detecting a communication capacity threshold can involve sending messages at maximum capacity, sending messages at some percentage of maximum capacity, sending messages at a rate trending towards capacity, or any suitable pattern that may be addressed by allocating more endpoints to the endpoint pool. Autoallocation may select endpoints based on the mix of endpoints existing in the endpoint pool. Autoallocation may select endpoints based on the mix of messaged destination endpoints. In another variation, autoallocation can be based on a user defined setting. Autoallocation may alternatively randomly select new endpoints or allocated new endpoints based on any suitable selection criteria. Endpoints may additionally be automatically released from an endpoint pool. For example, endpoints can be released when messaging capacity subsides or is below a particular threshold for some amount of time.

Selecting an endpoint from a shared endpoint pool S226 functions to use a shared set of communication endpoints. A shared set of communication endpoints is preferably a pool of endpoints usable by a plurality of entities. The shared set of communication endpoints can be provided by any suitable party. In one variation, the platform provider offers access to a shared set of communication endpoints. In another variation, a parent account offers subaccounts access to a shared set of communication endpoints. Shared endpoints can be lower priority endpoints that are used only when the owned endpoints are at capacity. Similar selection heuristics can be applied to the shared endpoint pool when used such matching the geographic region of a destination endpoint.

Block S200 may additionally include requeuing a message request when an endpoint from the endpoint pool is not available. When the set of communication endpoints is at a communication capacity, the request can be requeued, scheduled, or otherwise held to be processed at a later point. In one variation, a time window limit may be set for a particular communication request. If a communication or group of communications cannot be transmitted by the time window limit, the communications can be canceled. For example, in some cases, a user would prefer a message to not be sent than be sent after a particular time window. The time window limit can be specified for a particular message request or in the endpoint configuration.

Block S230, which includes establishing a communication to a destination endpoint from the associated selected communication endpoint, functions to send the message using an origin endpoint selected in Block S220. The recipient of the message will see that the message comes from the endpoint selected for that particular destination. For a communication request specifying a single destination, a single communication can be established. For a bulk communication request that specifies a plurality of destination endpoints, a set of distinct communication can be established. A communication can be attempted for each destination endpoint where a custom selected endpoint is automatically selected for each destination endpoint. In some variations a communication request can result in the communication being segmented into multiple communications. For example, the contents of a messaging request may necessitate the contents of the message request to be split into multiple messages. Establishing a communication can include transmitting an asynchronous message such as an SMS, MMS, IP message, or other suitable form of message. Establishing a communication can alternatively include dialing, calling, or otherwise attempting to establish a synchronous communication channel with at least one destination endpoint. For example, establishing a communication may make a call over the PSTN, make a call over SIP, make a video call, a conference call, start a screen sharing session, or any suitable real-time communication session.

The method can additionally include transforming content of the communication request, which functions to dynamically augment content according to the destination. The content of a communication may be transformed between media mediums. For example, text in a text messaging request may be transformed to text to speech audio, if a PSTN call is established for a particular destination endpoint. In another variation, contents may be translated to different languages based on the destination endpoint.

The method can additionally include reporting endpoint usage S130, which functions to provide analytics and data on how endpoints are being used from the endpoint pool. The endpoint usage can include usage count for each endpoint, percent used within the endpoint pool, the number of times the pool or a particular endpoint was at capacity, and/or other stats. The endpoint usage may additionally include a log of what endpoint was used for what destination. Capacity usage data can help an account holder evaluate if the endpoint pool is sufficient or too large. Automatic notifications based on the endpoint usage may alternatively be generated to notify when endpoints should be added or possibly removed from an endpoint pool.

The method can additionally include controlling messaging through an endpoint pool resource. The endpoint pool resource is preferably an accessible resource such as a REST API resource through which configuration and various aspects of associated communication requests may be managed. Real-time control of queued communications requests can be managed through the endpoint pool. Real-time control may be used for canceling communications, editing destination endpoints of a request, editing message content, or taking any suitable action on a communication. For example, if a bulk messaging request was made, numerous outbound messages may be queued to be sent from a variety of origin endpoints. The communication platform can enable a cancel message request to be directed at the endpoint pool and the unsent messages from that bulk request may be halted. Additionally, other messaging features such as keyword response, customized routing options, and other features can be managed through the endpoint point pool instead of setting up each individual endpoint.

The system and method of the preferred embodiment and variations thereof can be embodied and/or implemented at least in part as a machine configured to receive a computer-readable medium storing computer-readable instructions. The instructions are preferably executed by computer-executable components preferably integrated with the media intelligence platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   receiving, through an application programming interface, a set of communication requests directed at an endpoint pool resource, the endpoint pool resource including a set of account phone numbers associated with an account, the set of communication requests specifying a set of destination phone numbers;
   for each destination phone number in the set of destination phone numbers, selecting an account phone number from the set of account phone numbers, the selecting based on a determination that a geographic location of the destination phone number matches a geographic location of the account phone number, the selecting further based on a determination that the destination phone number did not previously receive a communication from any of the account phone numbers in the set of account phone numbers associated with the account; and
   initiating outbound communication with the destination phone number from an origin endpoint assigned as the selected account phone number.

2. The method of claim 1, wherein the geographic location of the destination phone number matching the geographic location of the account phone number depends on an area code.

3. The method of claim 2, wherein selecting the account phone number based on the determination that the geographic location of the destination phone number matches the geographic location of the account phone number is further based on regional proximity of the geographic location of the destination phone number and the geographic location of the account phone number.

4. The method of claim 1, wherein the geographic location of the destination phone number matching the geographic location of the account phone number depends on a country code and area code.

5. The method of claim 1, further comprising: detecting a capacity limit for initiated communications by the account and allocating new account phone numbers to the set of account phone numbers associated with the account.

6. The method of claim 1, further comprising receiving user input setting state of a sender continuity option, and wherein the determination that the destination phone number did not previously receive a communication from any of the account phone numbers in the set of account phone numbers associated with the account is performed if the state of the sender continuity option is active.

7. The method of claim 1, wherein initiating the outbound communication comprises sending a message to the destination phone number.

8. The method of claim 1, wherein initiating the outbound communication comprises initiating a synchronous communication session with the destination phone number.

9. A non-transitory computer-readable storage medium comprising computer-readable instructions that, when executed by one or more processors of a machine, cause the machine to perform operations comprising:
   receiving a set of communication requests directed at an endpoint pool resource, the endpoint pool resource including a set of account phone numbers associated with an account, the set of communication requests specifying a set of destination phone numbers;
   for each destination phone number in the set of destination phone numbers, selecting an account phone number from the set of account phone numbers, the selecting based on a determination that a geographic location of the destination phone number matches a geographic location of the account phone number, the selecting further based on a determination that the destination phone number did not previously receive a communication from any of the account phone numbers in the set of account phone numbers associated with the account; and
   initiating outbound communication with the destination phone number from the selected account phone number.

10. The non-transitory computer-readable storage medium of claim 9, wherein the geographic location of the destination phone number matching the geographic location account phone number depends on an area code, and wherein selecting the account phone number based on the determination that the geographic location of the destination phone number matches the geographic location of the account phone number is further based on regional proximity of the geographic location of the destination phone number and the geographic location of the account phone number.

11. The non-transitory computer-readable storage medium of claim 9, further comprising:
   detecting a capacity limit for initiated communication and allocating new account phone numbers to the set of account phone numbers associated with the account.

12. The non-transitory computer-readable storage medium of claim 9, further comprising receiving user input setting state of a sender continuity option, and wherein the determination that the destination phone number did not previously receive a communication from any of the account phone numbers in the set of account phone numbers associated with the account is performed if the state of the sender continuity option is active.

13. The non-transitory computer-readable storage medium of claim 9, wherein the geographic location of the destination phone number matching the geographic location of the account phone number depends on a country code and area code.

14. A system comprising:
   a communication platform comprising a programmatic interface for receipt of communication request;
   wherein the communication platform further comprises at least one non-transitory computer-readable medium storing instructions that when executed by at least one computer processor cause the communication platform to perform operations responsive to receiving a communication request through the programmatic interface, the communication request directed at an endpoint pool resource and specifying a set of destination phone numbers, the operations comprising:
   for each destination phone number in the set of destination phone numbers, selecting an account phone number from the set of account phone numbers, the selecting based on a determination that a geographic location of the destination phone number matches a geographic location of the account phone number, the selecting further based on a determination that the destination phone number did not previously receive a communication from any of the account phone numbers in the set of account phone numbers associated with the account, and
   initiating outbound communication with the destination phone number from an origin endpoint assigned as the selected account phone number.

15. The system of claim 14, wherein the geographic location of the destination phone number matching the geographic location of the account phone number depends on an area code.

16. The system of claim 15, wherein selecting the account phone number based on the determination that the geographic location of the destination phone number matches the geographic location of the account phone number is further based on regional proximity of the geographic location of the destination phone number and the geographic location of the account phone.

17. The system of claim 14, wherein the geographic location of the destination phone number matching the geographic location of the account phone number depends on a country code and area code.

18. The system of claim 14, the operations further comprising: detecting a capacity limit for initiated communication by the account and allocating new account phone numbers to the set of account phone numbers associated with the account.

19. The system of claim 14, the operations further comprising receiving user input setting state of a sender continuity option, and wherein the determination that the destination phone number did not previously receive a communication from any of the account phone numbers in the set of account phone numbers associated with the account is performed if the state of the sender continuity option is active.

* * * * *